H. R. DECKER & R. W. HOUK.
WELL SCREEN.
APPLICATION FILED JUNE 7, 1909.

975,334.

Patented Nov. 8, 1910.

WITNESSES:

INVENTORS
Harry R. Decker
Russell W. Hauk
BY
Edward V. Hareway
ATTORNEY

UNITED STATES PATENT OFFICE.

HARRY R. DECKER, OF HOUSTON, TEXAS, AND RUSSELL W. HOUK, OF VINITA, OKLAHOMA.

WELL-SCREEN.

975,334.  Specification of Letters Patent.  Patented Nov. 8, 1910.

Application filed June 7, 1909. Serial No. 500,511.

*To all whom it may concern:*

Be it known that we, HARRY R. DECKER, a citizen of the United States, residing at Houston, in the county of Harris and State of Texas, and RUSSELL W. HOUK, a citizen of the United States, residing at Vinita, county of Craig, and State of Oklahoma, have invented certain new and useful Improvements in Well-Screens, of which the following is a specification.

Our invention relates to new and useful improvements in well screens.

The object of the invention is to provide a screen of the character described that will readily admit of the passage of liquid into the screen pipe and at the same time exclude all sand, gravel etc.

To this end, and with the above and other objects in view, our invention has particular relation to certain novel features of construction and operation, an example of which is given in this specification, and illustrated in the accompanying drawings, wherein:—

Figure 1:
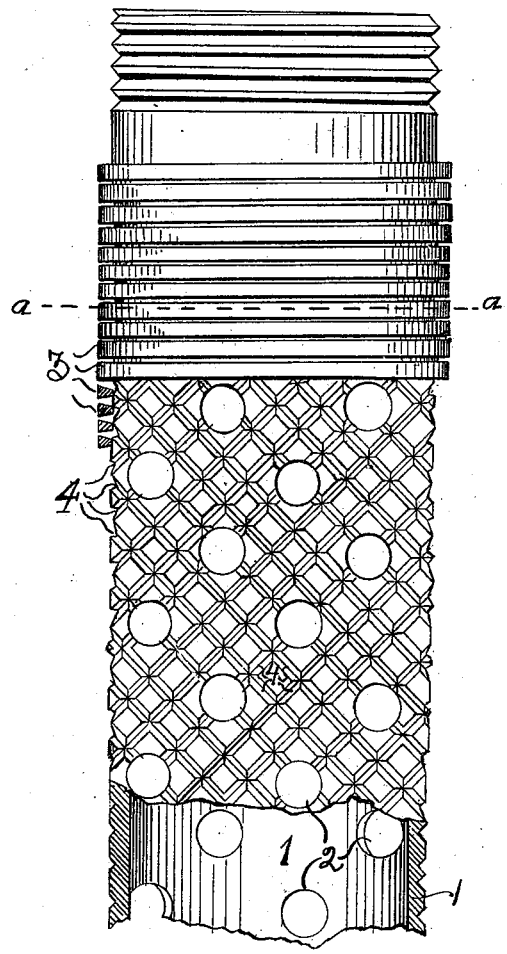
Figure 2:
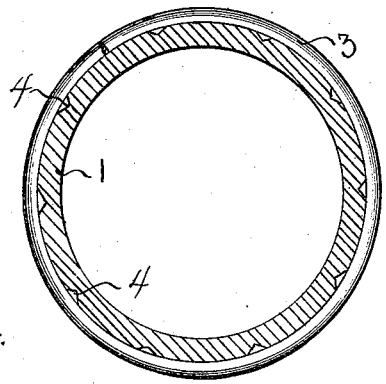

Figure 1 is a side elevation of a portion of the strainer, part of the wire covering being omitted to show the grooved and perforated pipe beneath. Fig. 2 is a transverse section on the line $a$—$a$ of Fig. 1.

Referring now more particularly to the drawings, wherein like numerals of reference designate similar parts in each of the figures, the numeral 1 refers to the strainer pipe, which is provided with a plurality of perforations 2, for the passage of the fluid. In practice the pipe is placed in the well after the manner of the tube of the ordinary oil or water well and the fluid percolates through the perforations 2 from the surrounding fluid reservoir.

The perforations 2 are spirally alined with each other, the spirals running both ways around the pipe, as shown in Fig. 1. These perforations are connected by grooves 4, preferably, but not necessarily, V-shaped. Thus a pipe is provided with one series of grooves spiraling therearound, in one direction; and with another series, correspondingly spiraled therearound, in the opposite direction, the grooves being so spaced as to intersect at the perforations 2. Free passage ways for the fluid, under the strainer 3 presently to be described, to the perforations 2 are thus provided. Intermediate grooves 4 may also be provided, if desired.

In order to prevent the inflowing fluid from carrying in dirt, and sand, it is necessary to provide a suitable filtering or straining device which will arrest the movement of the sand and foreign matter before it enters the pipe and still will not interfere, to any serious extent, with the passage of fluids, such as oil water or gas. For accomplishing this purpose we have provided the strainer 3 which consists of a wire, coiled or spiraled around the pipe 1, as shown in Fig. 1. The cross section of this wire is semi-circular, triangular or of any other desired contour. This wire is so coiled as to allow sufficient space between the whirls thereof, for the passage of fluid, and is secured, in any suitable manner to the pipe. The terminals of the wire are then secured to the strainer pipe, in any preferred manner, as by soldering, and the complete screen thus formed.

A well screen constructed in the manner shown and described, will be found to be cheap and easy to make, as well as strong and durable, and at the same time will permit the free passage of fluid into and from the same.

What we claim is:—

1. A well screen comprising a body with perforations spirally alined with each other around said body, a series of spiraled peripheral grooves connecting said perforations, a second series of grooves spiraled oppositely to the first series, and also connecting said perforations, and a strainer wire wound spirally around said body.

2. A well screen comprising a body with perforations therein, and having peripheral grooves connecting the perforations thereof, and also having intermediate grooves around said body not connecting the perforations thereof, and a strainer wound around said body.

3. A well screen comprising a body with perforations therein, spirally alined with each other around said body, said perforations being connected by peripheral grooves, said body also being provided with spiral grooves intermediate said first mentioned grooves, and a strainer wire wound around said body.

In testimony whereof we have signed our names to this specification in the presence of the subscribing witnesses.

HARRY R. DECKER.
RUSSELL W. HOUK.

Signed by Harry R. Decker in the presence of—
WM. A. CATHEY,
GLYNN DAVIS.

Signed by Russell W. Houk in the presence of—
WM. A. CATHEY,
C. DODSON.